277-79

File 74-108-21 Examiner

BEST AVAILABLE COPY 1,304,3

J. E. NORWOOD.
PISTON RING.
APPLICATION FILED DEC. 15, 1919.

1304,360

Reissued Oct. 26, 1920.

RE 14,969.

Witnesses
Porter H. Hault.
Selma Stern

Inventor
John E. Norwood.
By Edwin A. Samuels
Attorney

UNITED STATES PATENT OFFICE.

JOHN E. NORWOOD, OF BALTIMORE, MARYLAND.

PISTON-RING.

14,969. Specification of Reissued Letters Patent. Reissued Oct. 26, 1920.

Original No. 1,304,360, dated May 20, 1919, Serial No. 249,782, filed August 14, 1918. Application for reissue filed December 15, 1919. Serial No. 345,132.

*To all whom it may concern:*

Be it known that I, JOHN E. NORWOOD, a citizen of the United States, residing at Baltimore, in the State of Maryland, have invented certain new and useful Improvements in Piston-Rings, of which the following is a specification.

This invention relates to improvements in piston rings and has for its object to provide a peripheral groove or annular recess in the ring arranged to receive the oil on the downstroke and distribute it evenly and in a thin film over the surface of the cylinder during the upstroke, retaining sufficient of the oil in the groove between the surface of the ring and the cylinder wall to act as an effective seal, filling the crevices and irregularities in the cylinder wall, preventing the escape of gas by the piston, and preventing the entrance of oil into the combustion space and the dilution of the lubricant by and with condensed fuel, and to provide a supplemental ring which coöperates with the piston ring or rings to prevent the oil from working around and over the piston rings to the firing chamber, and to prevent the gas in the firing chamber from passing around the piston ring, and also to provide means to allow the oil that works under and back of the piston rings to drop back into the crank case.

The invention consists of the novel construction and arrangement of the parts and combination of parts hereinafter more fully set forth in the following specification and pointed out in detail in the appended claims.

In the accompanying drawing,—

Figure 1:
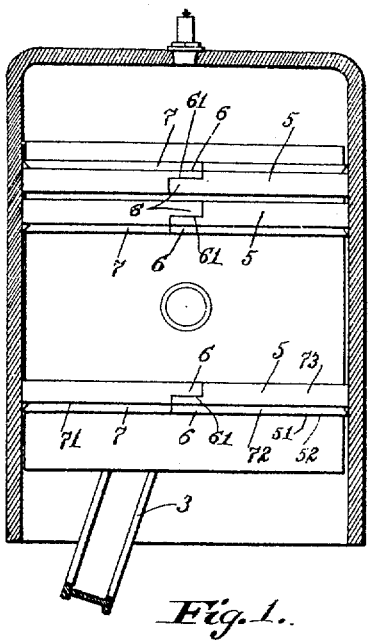
Figure 1 is a vertical section of a cylinder, the piston therein having my invention applied thereto.
Figure 2:
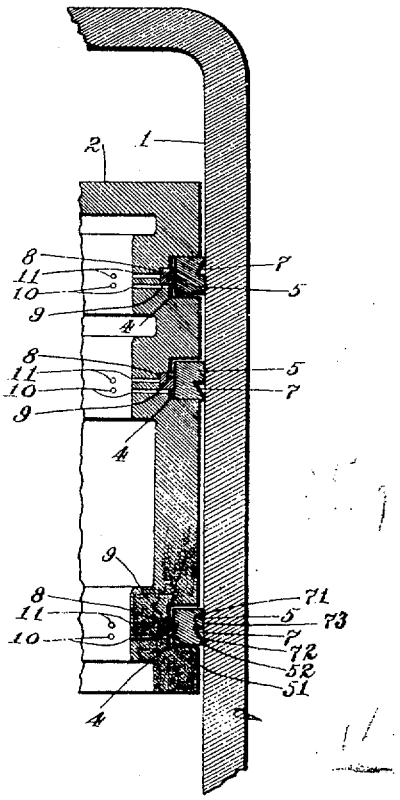
Fig. 2 is an enlarged section of a portion of the cylinder and piston.
Figure 4:
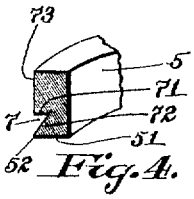
Fig. 4 shows the ring proper as used without the supplemental ring, the oil sealing groove being the important feature.

Referring to the accompanying drawings, forming part of this specification, and in which like reference numerals designate like parts throughout the several views, 1 designates a cylinder and 2 the piston, the latter being operated in the cylinder through the medium of the rod 3 leading to the crank-shaft (not shown) of the engine. The said piston is provided with annular grooves 4 into which the piston rings 5 fit. Said rings 5 as shown each have overlapping ends 6, preferably cut to form a step joint, the two ends presenting to each other flat contacting surfaces 61 and annular recesses 7 between the bottom and top face, more definitely the axial end surface 51, of the ring and the contacting flat surfaces 61 of the joint. The shape and position of the annular recess or groove 7 are of great importance in the formation and maintenance of the oil seal and distribution of the lubricant, and the prevention of gas leakage and loss of combustion and loss of the lubricant, by splashing, suction or injection into the combustion chamber with consequent fouling by carbonization of the walls of the combustion chamber and the cylinder head.

This groove is adjacent an axial end surface of the ring usually the bottom surface 51 as seated in operative position in a vertical engine. In the lower rings it is near the bottom surface, and in the upper rings it may be turned toward the top surface to prevent leakage of condensed fuel into the crank case. If less than a full set of these is used, the grooved edges should be turned toward the crank. Where there are three of the rings to a piston the top ring has the grooved edge turned up to catch condensed fuel and prevent its passing the piston after the manner described in connection with the oil seal.

The oil sealing groove of the invention has one surface or wall 71 at right angles to the outer peripheral or cylinder contacting face of the ring, and to the axis of both, and incidentally to the cylinder walls, and to the direction of stroke of the engine, and the other wall 72 inclined at an angle approximately half of a right angle to the contacting face of the ring or otherwise expressed at an acute angle to the same. This latter wall or inclined surface intersects the axial end surface 51 of the ring at the circumference, forming a peripheral edge 52 in the plane of the cylinder contacting surface of the ring, which though engaging the cylinder wall, at the same time admits a small quantity of oil to the sealing groove 7 on the down stroke and releases a small quantity of oil on the up stroke, forming a thin film on the surface of the cylinder wall sufficient for lubrication. On the other hand, the surface 71 which is at 90 degrees to the direction of stroke, and to the axis of the ring, with the contacting surface 73 above it, resists the passage of oil from this groove to the combustion space, and retains in the groove a quantity of cylinder oil, which fills all crevices and irregularities in the cylinder wall, and acts as a seal, preventing the escape of gas.

The inner surface of the grooves 4 is provided with a smaller annular groove 8 into each of which latter a supplemental ring 9 is fitted; said rings 9 have their outer surface bearing against the inner surface of the piston rings. Leading from each of the grooves 4 and 8 are a number of apertures 10 and 11, respectively, passing through the side of the piston to allow the oil to drop back into the crank case. When the supplemental ring is used and the piston 2 moves down, the rings 5 are against the top of their grooves which forces the oil under and back of the piston rings until it strikes the supplemental rings 9 which latter will prevent the oil working over the piston rings when the piston is forced up again, as in the case with the piston rings in present use. When the oil strikes the supplemental rings 9 it will pass through the apertures 10 to the crank case, and any oil which might work back of the supplemental rings 9 will drain through the apertures 11 and also drop back into the crank case.

Figure 3:
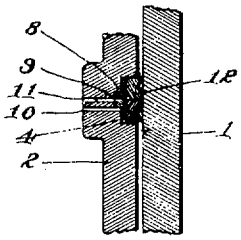
Fig. 3 is a modification showing the piston ring in two sections.

In Fig. 3 I have shown a modification of the piston ring 12, the same being made in two sections. The supplemental rings 9 fit closely in the grooves 8 and at all times impinge against the piston rings, and are not affected by centrifugal force or vacuum, and the oil that works under the piston rings 12 will strike the supplemental rings 9 and pass off through the apertures 10 to the crank case, and any oil that may work back of said supplemental rings 9 will drain through the apertures 11 and also drop back into the crank case.

While I have shown and described a piston ring with a groove in its outer surface, and also a piston ring formed of two sections, any other desired form of piston ring may be employed with the supplemental ring, and the ring having the groove with the right-angular and inclined walls with the oil distributing edge may be used in any desired combination or separately.

By means of the new form of sealing groove 7 described above which may be applied to any type of ring, the applicant has achieved an increased economy of cylinder oil, and decreased the carbon deposit, and improved the sealing or packing effect of the ring.

The position of the sealing groove immediately adjacent the bottom or axial end surface 51 of the ring with the inclined surface of the groove 7 forming a cylinder wiping, oil distributing and regulating edge 52, by which oil is admitted in small quantities to the sealing groove and distributed over the cylinder walls in combination with the right-angular surface 71 and the flat peripheral cylinder contacting surface 73, by which the further passage of oil is limited to the minimum, and the oil accumulated in the groove forming a pulsating oil seal which wipes the cylinder walls with the piston strokes filling and closing all crevices in the walls, preventing the loss of pressure and escape of gas is of great importance.

Having thus described my invention, what I claim is:

1. The combination of a piston ring having an annular groove in its outer surface provided with apertures leading to the inside of the piston and a smaller annular groove at the back of the first named annular groove and also provided with apertures leading from said smaller groove to the inside of the piston, a piston ring fitted in the said first-named annular groove, and a supplemental ring fitted in said smaller annular groove and impinging against the piston ring.

2. The combination of a piston having annular grooves in its outer surface each provided with apertures leading to the inside of the piston and a smaller annular groove back of each of said first named annular grooves and also provided with apertures leading to the inside of the piston, a piston ring in each of said first named annular grooves and each having a recess in its outer face one surface of which is cut at right angles to the face of the rings and the other surface is inclined, and a supplemental ring fitted in each of said smaller annular grooves and impinging against the piston rings.

3. A spring piston ring having its ends formed in a step joint, with sliding contacting surfaces and an annular groove in the peripheral surface, said groove being spaced from the plane of contact of said sliding surfaces, the ring having a peripheral flat surface adapted to bear on the cylinder wall, and including the intersection of said plane of contact of said sliding surfaces with the periphery of the ring, the groove having a wall at right angles to the axis of the ring and a wall sharply inclined to said axis, the inclined wall intersecting an axial end surface of the ring forming a peripheral annular edge of the diameter and circumference equal to those of the peripheral flat surface.

4. A spring piston ring having its ends formed in a step joint, with sliding contacting surfaces and an annular groove in its peripheral surface adjacent one axial end surface, substantially all of the remainder of the peripheral surface being flat or straight in the direction of the axis, said flat surface, including the intersection of said sliding surfaces with the periphery of the ring, so that the groove does not intersect the sliding surfaces, one wall of the groove being substantially at right angles to the axis of the ring, and another wall of the groove being sharply inclined to the axis and intersecting the axial end surface of the ring, forming a peripheral edge of the circumference and diameter equal to that of the peripheral flat surface of the ring.

5. A spring piston ring having its ends formed in a set joint, with sliding contacting surfaces and an annular groove in its peripheral surface adjacent one axial end surface, substantially all of the remainder of the peripheral surface being flat or straight in the direction of the axis, one wall of the groove being substantially at right angles to the axis of the ring, and another wall of the groove being sharply inclined to the axis, forming a peripheral edge of a circumference and diameter equal to that of the peripheral flat surface of the ring.

6. A one-piece spring piston ring for internal combustion engines, having a step joint at the meeting ends, with sliding, contacting surfaces; a peripheral plane surface to contact the cylinder walls, the same including the intersection of the sliding, contacting surfaces with the periphery; the ring also having a peripheral groove adjacent one axial end surface, the same being clear of the sliding surfaces so that it does not intersect them; the groove having an inclined wall intersecting the adjacent end surface, forming a peripheral edge of a diameter and circumference equal to the outside diameter of the ring, which is adapted to contact the cylinder walls and admit oil to the groove, confining it therein, forming an oil seal and distributing oil in small quantities over the cylinder surface for lubrication.

Signed by me at Baltimore, Maryland, this 13th day of November, 1919.

JOHN E. NORWOOD.

Witnesses:
PORTER H. FLAUTT,
EMMA AHLSLEGLE.